United States Patent
Steigelman et al.

(10) Patent No.: US 7,130,417 B1
(45) Date of Patent: Oct. 31, 2006

(54) TELEPHONE-COUPLED DEVICE FOR INTERNET ACCESS

(75) Inventors: Nicholas Steigelman, Los Banos, CA (US); Ronald S. Lesniak, Scotts Valley, CA (US)

(73) Assignee: Teledex Corporation, San Jose, CA (US)

( * ) Notice: Subject to any disclaimer, the term of this patent is extended or adjusted under 35 U.S.C. 154(b) by 0 days.

(21) Appl. No.: 09/333,565

(22) Filed: Jun. 21, 1999

(51) Int. Cl.
H04M 1/00 (2006.01)

(52) U.S. Cl. .............................. 379/413.02; 379/428.01

(58) Field of Classification Search ........... 379/387.01, 379/428.01, 435, 436, 438, 447, 428.04, 379/428.02, 428.03, 413.03, 413.02; 370/401, 370/402; 439/55

See application file for complete search history.

(56) References Cited

U.S. PATENT DOCUMENTS

| | | | | |
|---|---|---|---|---|
| 4,953,200 A | * | 8/1990 | Yamasaki | .................... 379/413 |
| 5,183,404 A | * | 2/1993 | Aldous et al. | ................. 439/55 |
| 5,237,605 A | * | 8/1993 | Peak et al. | .............. 379/428.01 |
| 5,528,690 A | * | 6/1996 | Shahrebani | ................... 379/438 |
| 5,583,922 A | * | 12/1996 | Davis et al. | ............. 379/93.09 |
| 5,654,957 A | * | 8/1997 | Koyama | ..................... 370/402 |
| 5,862,214 A | * | 1/1999 | Aggus et al. | ................ 379/435 |
| 5,995,621 A | * | 11/1999 | Bryant et al. | .......... 379/428.04 |
| 6,028,984 A | * | 2/2000 | Kimball | ....................... 370/401 |
| 6,137,866 A | * | 10/2000 | Staber et al. | .......... 379/413.03 |
| 6,198,632 B1 | * | 3/2001 | Goff | ........................... 361/752 |

OTHER PUBLICATIONS

Tokin EMI—EMC Components—Data line Filters, EMI Suppressor Sheets—"Flex Suppressor" (date unknown).

* cited by examiner

Primary Examiner—Jefferey F. Harold
(74) Attorney, Agent, or Firm—Thelen Reid & Priest LLP

(57) ABSTRACT

An apparatus is provided which can be physically connected underneath a guest telephone in a hotel. The apparatus is set up with interconnection logic and a networking card so as to allow for a notebook computer to interconnect with a local area network in the hotel. The apparatus is set up to switch between sending a voice data from the guest telephone or computer data packets from the notebook computer across the hotel room telephone wire.

5 Claims, 4 Drawing Sheets

TELEPHONE-COUPLED DEVICE FOR INTERNET ACCESS

BACKGROUND OF THE INVENTION

There is a large market for guest telephones of the type used in hotels. Recently, many guests, especially business travelers, bring notebook computers to hotels. Most notebook computers support modem access to the external world. It is becoming more popular to have faster access across network ports. There has not yet been a standardized location for interconnecting the notebook to Internet using a network port. It is often unclear whether a hotel room has such a network port. If network ports are located in the hotel room, they are often hard to locate.

It is desired to have an improved apparatus for connecting notebooks computers with the Internet at hotel rooms.

SUMMARY OF THE INVENTION

The present invention comprises an apparatus which is positioned underneath the guest telephone. The apparatus includes a shell with positions to allow for interconnection logic and a networking card. The interconnection logic allows voice data from the telephone and Ethernet data from the notebook computer to pass along the hotel room telephone wire to the proper connection. In a preferred embodiment, the shell has a port region for connecting to the telephone wire, a wire for connecting between the apparatus and the guest telephone, and connection port for connecting to a notebook computer. Interconnection logic in the apparatus can be used to route the signals between the ports in the correct manner. The interconnection logic is set up to work with a variety of different types of available networking cards. In a preferred embodiment, the networking cards are Ethernet cards. The Ethernet cards in the apparatus allows the notebook computer to interconnect to a local area network at the hotel and then out to the Internet. By positioning the apparatus beneath the guest telephone, the network card is in a location which is convenient and intuitive for the guest.

Another embodiment of the present invention comprises a shell fitting underneath a guest telephone. The shell is wedge shaped to hold the telephone at an angle and has extensions to physically connect to the bottom of the guest telephone. The shell has port locations for connecting to the notebook and guest telephone.

DETAILED DESCRIPTION OF THE PREFERRED EMBODIMENT

Figure 1:
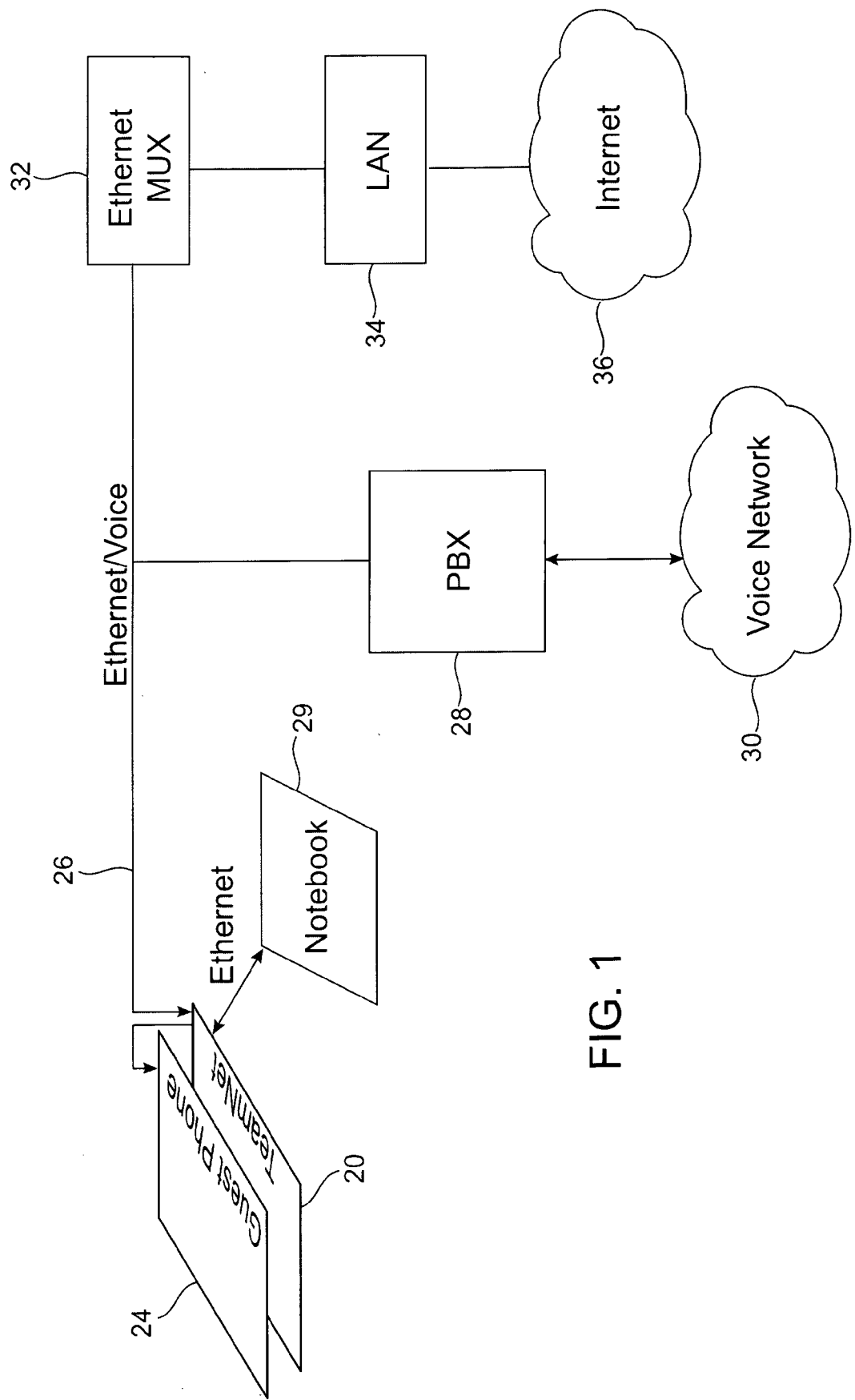
FIG. 1 is a block diagram that shows the interconnection of the apparatus of the present invention with other units.

FIG. 1 is a diagram that illustrates the interconnection of the apparatus 20 of the present invention with a guest telephone 24. In this system, the wire 26 from the public branch exchange (PBX) 28 connects to the apparatus 20 rather than directly to the guest telephone. This wire connection 26 can be a conventional telephone wire. The apparatus 20 also includes a connection to a notebook computer 29. This connection can be a direct connection such as with an RJ45 connection port or a wireless connection. Interconnection logic (not shown) in the apparatus 20 can direct the voice data from the guest telephone 24 or Ethernet data from the notebook computer 29 across the wire 26. Voice data is interpreted by the PBX 28 and sent out across the voice network 30. The ethernet data is interpreted by the ethernet multiplexer (MUX) 32 which is connected to the LAN 34 and allows interconnection to the Internet 36. The connections to the PBX 28 is done using analog signals and the connections to the Ethernet MUX 32 are done using digital signals. For this reason it is relatively easy for the PBX 28 and Ethernet MUX 32 to determine the correct signal and to filter out the unwanted signal.

Figure 2:
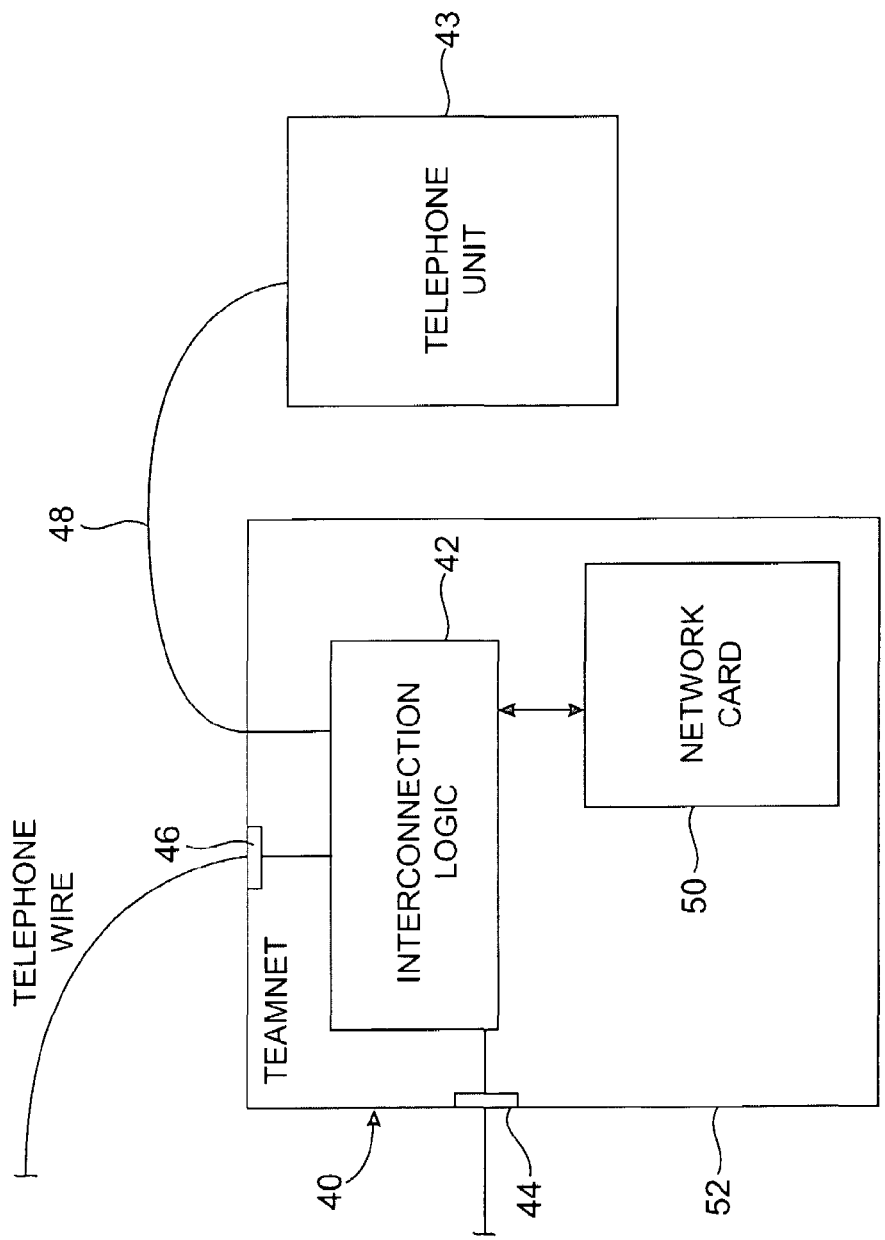
FIG. 2 is a block diagram that shows the apparatus of the present invention.

FIG. 2 is a block diagram illustrating the apparatus 40 interconnected to the telephone unit 43. The apparatus 40 includes interconnection logic 42 which allows switching between the port 44 connected to the notebook computer, port 46 connected to the telephone wire, and wire 48 connected to the telephone unit 43. The interconnection logic 42 routes the analog voice signals between ports 44 and 46, routes the signals from the notebook computer to the network card 50; and routes the Ethernet signals from the network card 50 out the port 46 to the telephone wire. Due to the passive filtering as discussed above, much of the connections in the interconnection logic can be simple connections. The network card 50 is preferably an Ethernet card such as the type which supports 10 base T Ethernet connections. The ports 44 and 46 include, port regions defined within the shell 52 of the apparatus.

Figure 3A:
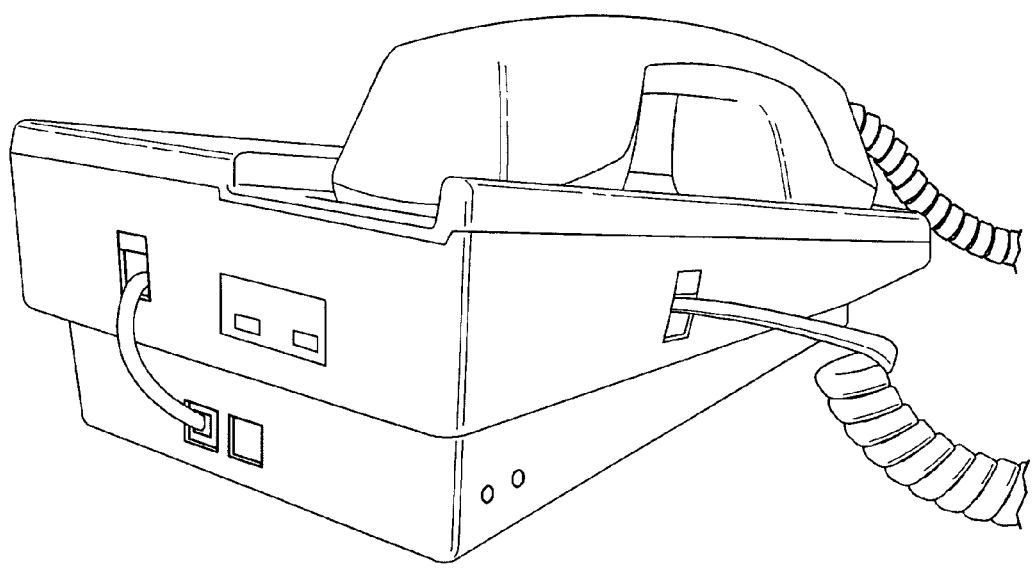
FIGS. 3A and 3B are perspective pictures of the apparatus of the present invention interconnected to a guest telephone.
Figure 3B:
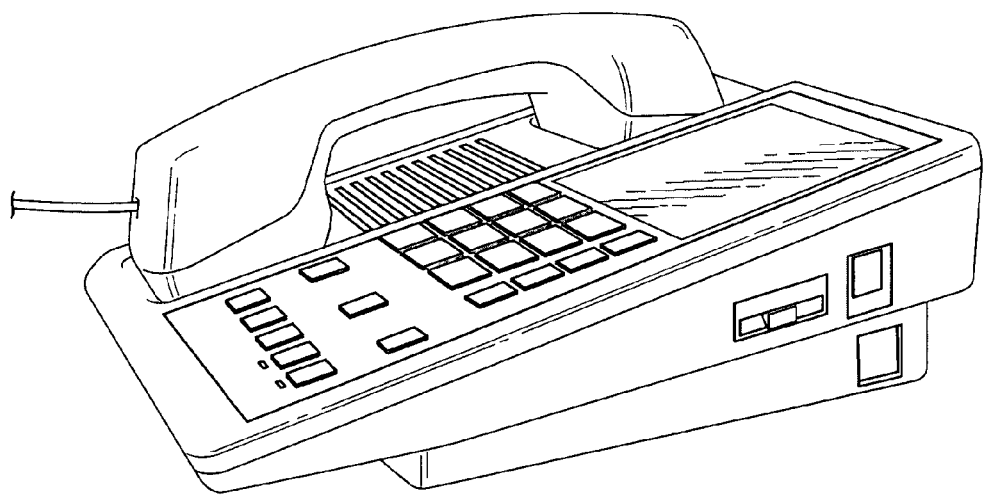

FIGS. 3A and 3B are pictures which illustrate the apparatus of one embodiment of the present invention. FIG. 3A shows the connection between the telephone unit and the apparatus of the present invention. The FIG. 3B shows the interconnection port for connecting to the notebook computer. In a preferred embodiment, the apparatus of the present invention is wedge shaped so that it provides a tilt which makes it more convenient for the user of the telephone.

Figure 4:
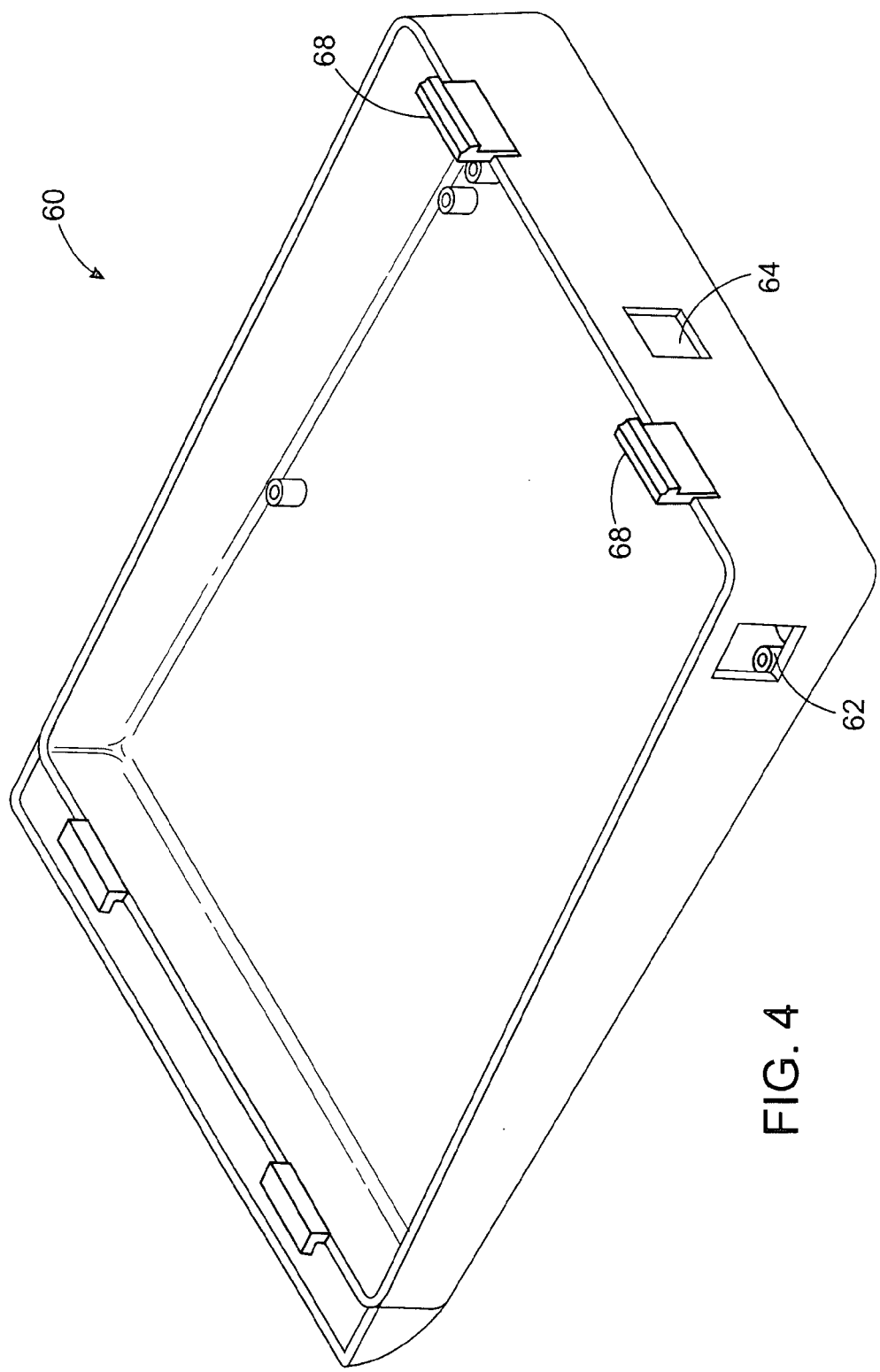
FIG. 4 is a diagram of the shell of one embodiment of the present invention.

FIG. 4 is a diagram of the shell 60 for one embodiment of the present invention. In a preferred embodiment, the shell includes a port region 62 for connecting to the notebook computer and a port region 64 for connecting to the telephone wire. The connection to the guest telephone can be done with a short dedicated wire that can exit through a cut (not shown) at the back of the wedge. In a preferred embodiment, the shell 60 is wedge shaped. The shell also includes extensions 68 which connects to a conventional guest telephone. Often guest telephones include a stand to tilt the telephone. The extensions 68 fit into the guest telephone such as that of the apparatus of the present invention takes the place of the conventional telephone stand.

By taking the place of the stand, the apparatus of the present invention can be conveniently positioned underneath the guest telephone. The apparatus of the present invention is positioned close to the guest telephone and thus in an intuitively logical location to be checked for interconnection to a notebook computer.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes with come within the meaning and range for equivalent thereof are intended to be embraced herein.

The invention claimed is:

1. An apparatus comprising:
a wedge-shaped shell adapted to physically connect under a telephone, the shell having a port to connect to a telephone wire;
the shell containing interconnection logic operably connected to the port and a wire to connect to the telephone; and
a networking card in the shell for connecting to a personal computer, the networking card being operably connected to the interconnection logic, wherein digital data from the network card and voice data from the telephone wire.

2. The apparatus of claim 1, wherein the shell has a port to connect to the personal computer.

3. An apparatus comprising:
a shell adapted to physically connect under a telephone, the shell having a port to connect to a telephone wire;
the shell containing interconnection logic operably connected to the ports and a wire to connect to the telephone; and
a networking card in the shell for connecting to a personal computer, the networking card being operably connected to the interconnection logic, wherein digital data from the network card and voice data from the telephone can be alternately sent across the telephone wire, wherein electronics in the shell allow for a wireless connection to the personal computer.

4. An apparatus comprising:
a shell adapted to physically connect under a telephone, the shell having a port to connect to a telephone wire;
the shell containing interconnection logic operably connected to the ports and a wire to connect to the telephone; and
a networking card in the shell for connecting to a personal computer, the networking card being operably connected to the interconnection logic, wherein digital data from the network card and voice data from the telephone can be alternately sent across the telephone wire, wherein the shell has extensions for physically connecting to the bottom of the telephone.

5. An apparatus comprising:
a shell adapted to physically connect under a telephone, the shell having a port to connect to a telephone wire;
the shell containing interconnection logic operably connected to the ports and a wire to connect to the telephone; and
a networking card in the shell for connecting to a personal computer, the networking card being operably connected to the interconnection logic, wherein digital data from the network card and voice data from the telephone can be alternately sent across the telephone wire, wherein the network card is an Ethernet card.

* * * * *